(12) United States Patent
Tolling et al.

(10) Patent No.: US 8,884,183 B2
(45) Date of Patent: Nov. 11, 2014

(54) WELDING PROCESS AND A WELDING ARRANGEMENT

(75) Inventors: Johan Tolling, Göteborg (SE); Kari Erik Lahti, Alingsås (SE)

(73) Assignee: ESAB AB, Gothenburg (SE)

( * ) Notice: Subject to any disclaimer, the term of this patent is extended or adjusted under 35 U.S.C. 154(b) by 0 days.

(21) Appl. No.: 13/515,054

(22) PCT Filed: Dec. 16, 2009

(86) PCT No.: PCT/EP2009/067289
§ 371 (c)(1),
(2), (4) Date: Aug. 1, 2012

(87) PCT Pub. No.: WO2011/072734
PCT Pub. Date: Jun. 23, 2011

(65) Prior Publication Data
US 2012/0325786 A1    Dec. 27, 2012

(51) Int. Cl.
B23K 26/00 (2014.01)
B23K 26/14 (2014.01)
B23K 9/02 (2006.01)
B23K 9/025 (2006.01)
B23K 28/02 (2014.01)
B23K 9/18 (2006.01)

(52) U.S. Cl.
CPC .......... B23K 9/0213 (2013.01); B23K 26/1429 (2013.01); B23K 9/025 (2013.01); B23K 28/02 (2013.01); B23K 9/18 (2013.01)
USPC ............ 219/121.64; 219/121.61; 219/121.62; 219/121.63; 219/121.67; 219/121.68; 219/121.72; 219/121.73; 219/121.74

(58) Field of Classification Search
CPC ........... B23K 9/18; B23K 26/14; B23K 26/20
USPC .............. 219/121.6–121.64, 121.67–121.68, 219/121.72–121.74; 138/177; 156/272.8
See application file for complete search history.

(56) References Cited

U.S. PATENT DOCUMENTS 4,214,141 A * 7/1980 Okuda et al. ................. 219/73
4,507,540 A * 3/1985 Hamasaki ............... 219/121.64
(Continued)

FOREIGN PATENT DOCUMENTS

EP   1 160 046      12/2001
JP   72009723 B  *  9/1968
(Continued)

OTHER PUBLICATIONS

Tusek, J, Suban, M; Hybrid welding with arc and laser beam; Oct. 1, 1999; Science and Technology of Welding & Joining; vol. 4, No. 5, Oct. 1999; pp. 308-311.*

(Continued)

*Primary Examiner* — Dana Ross
*Assistant Examiner* — Brett Spurlock
(74) *Attorney, Agent, or Firm* — Kacvinsky Daisak Bluni PLLC

(57) ABSTRACT

A welding arrangement and a welding process for forming a weld seam between two edge portions, wherein the edge portions form a Y joint having a root portion and a bevel portion, said root portion being welded by a hybrid laser electric arc welding process including directing a laser beam and an electric arc in a single interaction zone of plasma and molten metal. A hybrid laser electric arc welding head and welding submerged arc welding head are arranged on a common carrier structure for welding the Y joint.

19 Claims, 6 Drawing Sheets

(56) References Cited

U.S. PATENT DOCUMENTS

| | | | |
|---|---|---|---|
| 4,765,525 A * | 8/1988 | Popp et al. | 228/9 |
| 5,372,297 A * | 12/1994 | Bay et al. | 228/125 |
| 5,595,670 A * | 1/1997 | Mombo-Caristan | 219/121.64 |
| 5,723,842 A * | 3/1998 | Webb | 219/73 |
| 5,746,579 A * | 5/1998 | Amos et al. | 416/204 A |
| 5,756,966 A * | 5/1998 | Offer | 219/124.03 |
| 5,821,493 A * | 10/1998 | Beyer et al. | 219/121.46 |
| 5,869,805 A * | 2/1999 | Beyer et al. | 219/121.83 |
| 6,080,960 A * | 6/2000 | Fournier et al. | 219/137 WM |
| 6,153,847 A * | 11/2000 | Nakatani et al. | 219/72 |
| 6,191,386 B1 * | 2/2001 | Albright et al. | 219/130.4 |
| 6,207,920 B1 * | 3/2001 | Morlock | 219/54 |
| 6,294,754 B1 * | 9/2001 | Nagura et al. | 219/121.63 |
| 6,336,583 B1 * | 1/2002 | Wang et al. | 228/175 |
| 6,489,583 B1 * | 12/2002 | Feng et al. | 219/121.14 |
| 6,568,077 B1 * | 5/2003 | Hellemann et al. | 29/889.1 |
| 6,596,969 B1 * | 7/2003 | Sakurai et al. | 219/122 |
| 6,608,281 B2 * | 8/2003 | Ishide et al. | 219/121.78 |
| 6,664,507 B2 * | 12/2003 | Akaba et al. | 219/130.5 |
| 6,940,036 B2 * | 9/2005 | Bayer et al. | 219/121.46 |
| 7,049,540 B2 * | 5/2006 | Sanders et al. | 219/121.39 |
| 7,154,064 B2 * | 12/2006 | Wang et al. | 219/168 |
| 7,154,065 B2 * | 12/2006 | Martukanitz et al. | 219/121.64 |
| 7,241,971 B2 * | 7/2007 | Bonnet | 219/137 WM |
| 7,288,737 B2 | 10/2007 | Briand | |
| 7,408,130 B2 * | 8/2008 | Sonoda et al. | 219/137 R |
| 7,718,917 B2 * | 5/2010 | Wang et al. | 219/91.2 |
| 7,874,471 B2 * | 1/2011 | Fairchild et al. | 228/112.1 |
| 8,253,061 B2 * | 8/2012 | Nowak et al. | 219/121.63 |
| 8,319,148 B2 * | 11/2012 | Nowak et al. | 219/121.76 |
| 8,344,283 B2 * | 1/2013 | Watanabe | 219/121.63 |
| 8,378,260 B2 * | 2/2013 | Knipper | 219/137 WM |
| 2001/0052511 A1 | 12/2001 | Briand et al. | |
| 2002/0017509 A1 * | 2/2002 | Ishide et al. | 219/121.63 |
| 2005/0011868 A1 * | 1/2005 | Matile et al. | 219/121.64 |
| 2005/0103751 A1 * | 5/2005 | Nicklas | 219/73 |
| 2005/0284853 A1 * | 12/2005 | Takahashi et al. | 219/130.4 |
| 2006/0243717 A1 * | 11/2006 | Holverson et al. | 219/130.51 |
| 2006/0261045 A1 * | 11/2006 | Wang et al. | 219/85.12 |
| 2007/0017906 A1 * | 1/2007 | Nowak et al. | 219/121.64 |
| 2007/0175568 A1 * | 8/2007 | Wang et al. | 156/155 |
| 2007/0251927 A1 * | 11/2007 | Miessbacher et al. | 219/121.63 |
| 2008/0011720 A1 * | 1/2008 | Briand et al. | 219/61 |
| 2008/0057341 A1 * | 3/2008 | Bouillot et al. | 428/685 |
| 2008/0116175 A1 * | 5/2008 | Ballerini et al. | 219/74 |
| 2008/0118352 A1 * | 5/2008 | Wheeler et al. | 415/209.2 |
| 2008/0164301 A1 * | 7/2008 | Nowak et al. | 228/226 |
| 2008/0245774 A1 * | 10/2008 | Kim et al. | 219/74 |
| 2008/0265573 A1 * | 10/2008 | Holdren | 285/288.1 |
| 2009/0032504 A1 * | 2/2009 | Kamei | 219/121.64 |
| 2009/0095720 A1 * | 4/2009 | Kamei | 219/121.64 |
| 2010/0108655 A1 | 5/2010 | Knipper | |
| 2010/0230390 A1 * | 9/2010 | Nishio et al. | 219/121.64 |
| 2010/0314362 A1 * | 12/2010 | Albrecht | 219/121.63 |
| 2011/0042361 A1 * | 2/2011 | Nowak et al. | 219/121.64 |
| 2012/0261389 A1 * | 10/2012 | Lin et al. | 219/121.46 |

FOREIGN PATENT DOCUMENTS

| | | | |
|---|---|---|---|
| JP | 02207996 A * | 8/1990 | |
| JP | 2004306084 A | 11/2004 | |
| JP | 2008138304 A | 11/2006 | |
| JP | 2008023569 A | 2/2008 | |
| JP | 2008-168319 | 7/2008 | |
| KR | 1020080001821 A | 1/2008 | |
| WO | WO 2008/138304 | 11/2008 | |

OTHER PUBLICATIONS

International Search Report (PCT/ISA/210) issued on Sep. 22, 2010, by the European Patent Office as the International Searching Authority for International Application No. PCT/EP2009/067289.

Written Opinion (PCT/ISA/237) issued on Sep. 22, 2010, by the European Patent Office as the International Searching Authority for International Application No. PCT/EP2009/067289.

J. Tusek et al., "Hybrid Welding With ARC and Laser Beam", Science and Technology of Welding and Joining, Institute of Materials, Oct. 1, 1999, vol. 4, No. 5; pp. 308-311, XP-009071730.

* cited by examiner

WELDING PROCESS AND A WELDING ARRANGEMENT

FIELD OF INVENTION

The invention relates to a welding process for forming a beveled joint weld seam between two edge portions. In particular the invention relates to a welding process for forming a beveled joint weld seam between two edge portions of a work piece or work pieces to be joined, where the work piece or work pieces are relatively thick, that is the thickness of the work piece or work pieces exceeds 20 mm. The invention furthermore relates to a welding arrangement being arranged to perform such a welding method.

BACKGROUND OF INVENTION

Hybrid laser electric arc welding processes are widely used in industrial manufacturing. Hybrid laser electric arc welding is a combination of a laser welding process and an electric arc welding process, where a laser beam and an electric arc are directed to a single interaction zone at the work piece or work pieces that are to be welded. The laser beam may produce a high intensity amounting to around 1 MW/cm$^2$. The laser beam will create a vapor cavity, known as a keyhole, having a high depth to width ratio. The arc produces generally a substantially lower intensity, around 1 kW/cm$^2$. The focal spot of the arc is however substantially larger. As a result, the seam from an arc welding process is wider. For this reason, the bridging of gaps is considerably better when using an arc welding process. In a hybrid laser electric arc welding process the benefits of the two welding processes are combined, which result in a welding process with a higher welding speed and weld depth in comparison each welding process taken alone. The ratio of the power input from respective process will determine which welding process predominate the hybrid laser electric arc welding process. The hybrid laser electric arc welding process takes place under a shielding gas where the laser beam and the arc act on the work piece at essentially the same position.

An example of a hybrid laser electric arc welding process is disclosed in U.S. Pat. No. 7,288,737, which relates to a method for laser/MIG hybrid welding by depositing molten material into at least a portion of a bevel formed between edges to be welded together. It is suggested that the method disclosed in U.S. Pat. No. 7,288,737 is suitable for forming a weld seam between two edge portions of a work pieces having a thickness up till 60 mm.

It has however been shown that it is difficult forming a joint of high quality using prior art methods. Problems that may arise include a difficulty in achieving a stable welding process when forming weld seams between edge portions of a work piece or work pieces that are thick. In an unstable welding process the penetration into the work piece may vary such that there is a risk for that the vapor filled cavity collapses and molten metal penetrates into the backside of the work piece. The use of backings, that is a well known method to prevent that molten material flows out from the gap between the edges and may be lost, may then become necessary. In some cases though, the use of backings may be physically prevented due to limited access to the back side of the work piece.

Another problem that may arise when forming weld seams between thick work pieces is that the weld seam may become deteriorated due to formation of hard brittle zones around the joint. The hard brittle zones are formed during rapid cooling at the seam. It has been shown that when increasing the thickness of the work pieces to be joined, the problem with formation of localized hard brittle zones may increase. The problem of formation of localized hard brittle zones is also increased when welding high strength steels, that is steels having a yield strength exceeding 355 MPa. When using such materials, the peaks of material hardness in the zones surrounding the joint become even higher than in comparative welds in less strong materials.

BRIEF DESCRIPTION OF THE INVENTION

It is an object of the invention to mitigate the problems set out above.

This object is achieved by a welding process according to claim 1. The invention relates to a welding process for forming a weld seam between two edge portions. The edge portions are formed into a Y joint having a root portion and a bevel portion. In the welding process according to the invention the root portion is welded by a hybrid laser electric arc welding process. The hybrid laser electric arc welding process comprises directing a laser beam and an electric arc in a single interaction zone of plasma and molten metal, the single interaction zone being located at said root portion. The hybrid process is characterized by a high temperature and a low heat input, and the use of the hybrid laser electric arc welding process will therefore result in a heat affected zone which is relatively narrow and which includes an overheated zone at which the joint has an increased hardness. In order to reduce the hardness in the zone affected from the hybrid laser electric arc welding process, the bevel portion is in the process according to the invention welded by a submerged arc welding process. Furthermore, the hybrid laser electric arc welding head and the submerged arc welding head are arranged on a common carrier structure. Welding of a Y joint in a single pass is thus enabled. The submerged arc welding process is characterized by a high heat input, while the intensity of the power input is rather low. The heat transferred to the work piece from the submerged arc welding process will heat treat the heat affected zone from the hybrid laser welding process such that the peaks of hardness in the hard brittle zones formed during the hybrid laser electric arc welding is reduced.

The process according to the invention is particularly suitable for welding joints where the root portion has a thickness exceeding 8 mm, preferably exceeding 10 mm. In order to have a good penetration of the laser into the work piece when forming a thick root seam, the power of the laser should preferably amount to 1 kW/mm thickness of root at a welding speed of 1 m/minute, that is for an 8 mm joint the power of the laser should preferably amount to 8 kW at a welding speed of 1 m/minute. Correspondingly for a 10 mm joint the power of the laser should preferably amount to 10 kW at a welding speed of 1 m/minute. This requirement may be applicable for roots having a thickness between 7-30 mm.

In order to keep the welding process stable, such that the vapor pressure in the vapor cavity can sustain the molten metal puddle and in order to provide a sufficient bridging capability, the power supplied by the arc welding process should balance the power of the laser, that is the power of the arc welding process in the hybrid process should be substantially equal to the power supplied by the laser. Hence, the ratio of the power from the laser divided by the power from the arc welding process in the hybrid process should preferably amount to in between 0.9 and 1.1.

The individual effects of the laser beam and electric arc divided by the thickness of the root portion and the welding speed should thus preferably correspond to 1 Ws/m$^2$.

At the power inputs from the laser when welding a root portion exceeding 8 mm, the power input from the arc welding process cannot be made sufficiently high to provide a sufficient high heat input to sufficiently reduce the level of the peaks of hardness in the joint. With the use of a submerged arc welding process following the hybrid process a sufficiently large heat input can be achieved to level out the hardness peaks sufficiently.

The amount of heat input required will depend on the depth of the bevel portion, since the heat input is proportional to the volume of the bevel portion. An adequate heat input for a thick root portion will be provided for bevel portions having a depth exceeding 15 mm, preferably exceeding 20 mm. It is particularly preferred that a ratio between a thickness of the root portion and a depth of the bevel portion is in between 0.4 and 0.6.

The welding process defined above enables the forming of a weld seam between two edge portions, wherein said edge portions form a Y joint having a root portion and a bevel portion, for work pieces having a thickness exceeding 15 mm preferably for work pieces having a thickness between 30-60 mm, in a single welding pass. The welding process according to the invention therefore enables efficient manufacturing of weld seams in thick goods, where the quality of the weld seams can be maintained since the peak levels of the hardness at the hard brittle zones will be sufficiently reduced.

The welding process according to the invention is particularly suitable for forming weld seams where at least one of the edges are part of a work piece of a high strength steel having a yield strength exceeding 355 Mpa.

The welding parameters for the submerged arc welding process may be selected in such a way that the heat affected zone of the submerged arc welding process encompasses the heat affected zone of the hybrid laser electric arc welding process.

The inventive process relates to forming a weld seam between edge portions that define a Y joint. The Y joint is having a root portion and a bevel portion. The bevel portion is positioned on a first side of a work piece or work pieces to be joined and the root portion extends to a second opposite side of the work piece or work pieces to be joined. In the inventive welding process the welding parameters for the submerged arc welding process are selected such that a heat affected zone of the submerged arc welding process extend down to said second opposite side.

The invention also relates to a welding arrangement for welding a Y joint having a root portion and a bevel portion. In operation the bevel portion is positioned on a first side of a work piece or work pieces to be joined and that the root portion extends to a second opposite side of the work piece or work pieces to be joined. The welding arrangement includes a hybrid welding head arranged to weld said root portion. The hybrid welding head being mounted for in operation facing said first side. The welding arrangement further includes a submerged arc welding head being mounted for in operation facing said first side. The hybrid welding head and the submerged arc welding head are both mounted on a common carrier structure. The hybrid welding head and the submerged arc welding head thus operate from the same side of the work piece or work pieces to be joined. Hence, the welding arrangement enables welding of a seam in a thick working piece in a single welding pass, wherein the single pass the root portion is welded by a hybrid laser electric arc welding process and the bevel portion is welded by a submerged arc welding process. The common carrier structure may be a stationary carrier structure or a moveable carrier structure. The purpose of the common carrier structure is to enable welding of a Y joint in a single pass of a hybrid laser electric arc welding process welding a root portion combined with a submerged arc welding process welding the bevel portion, where both the welding head for the hybrid laser electric arc welding process are located on the bevel side of the work piece. For this purpose the common carrier structure may suitably be unitary, such as a single bracket, frame, arm, carriage etc. carrying both welding heads, alternatively the common carrier structure may be composed of a plurality of elements, such as a plurality of brackets, frames, arms, carriages where one welding head is carried by one element and the other by another element, as long as the common carrier structure fulfils the purpose of enabling welding of a Y joint in a single pass of a hybrid laser electric arc welding process welding a root portion combined with a submerged arc welding process welding the bevel portion, where both the welding head for the hybrid laser electric arc welding process are located on the bevel side of the work piece, and where the plurality of elements allows movement of the welding heads in unison with respect to the welding seam.

The welding arrangement further includes an actuator which is arranged to drive a relative movement between the common carrier structure and the work pieces or work pieces to be joined.

The hybrid welding head and submerged arc welding head may be mounted on a common carrier structure which may be propelled on or over the work pieces or work pieces to be joined. Alternatively, the hybrid welding head and submerged arc welding head may be mounted on a common carrier structure which is stationary and that said actuator is arranged to propel the work pieces or work pieces to be joined.

BRIEF DESCRIPTION OF DRAWINGS

An embodiment of the invention will be described below in connection with appended drawings, where.

DETAILED DESCRIPTION

Figure 1:
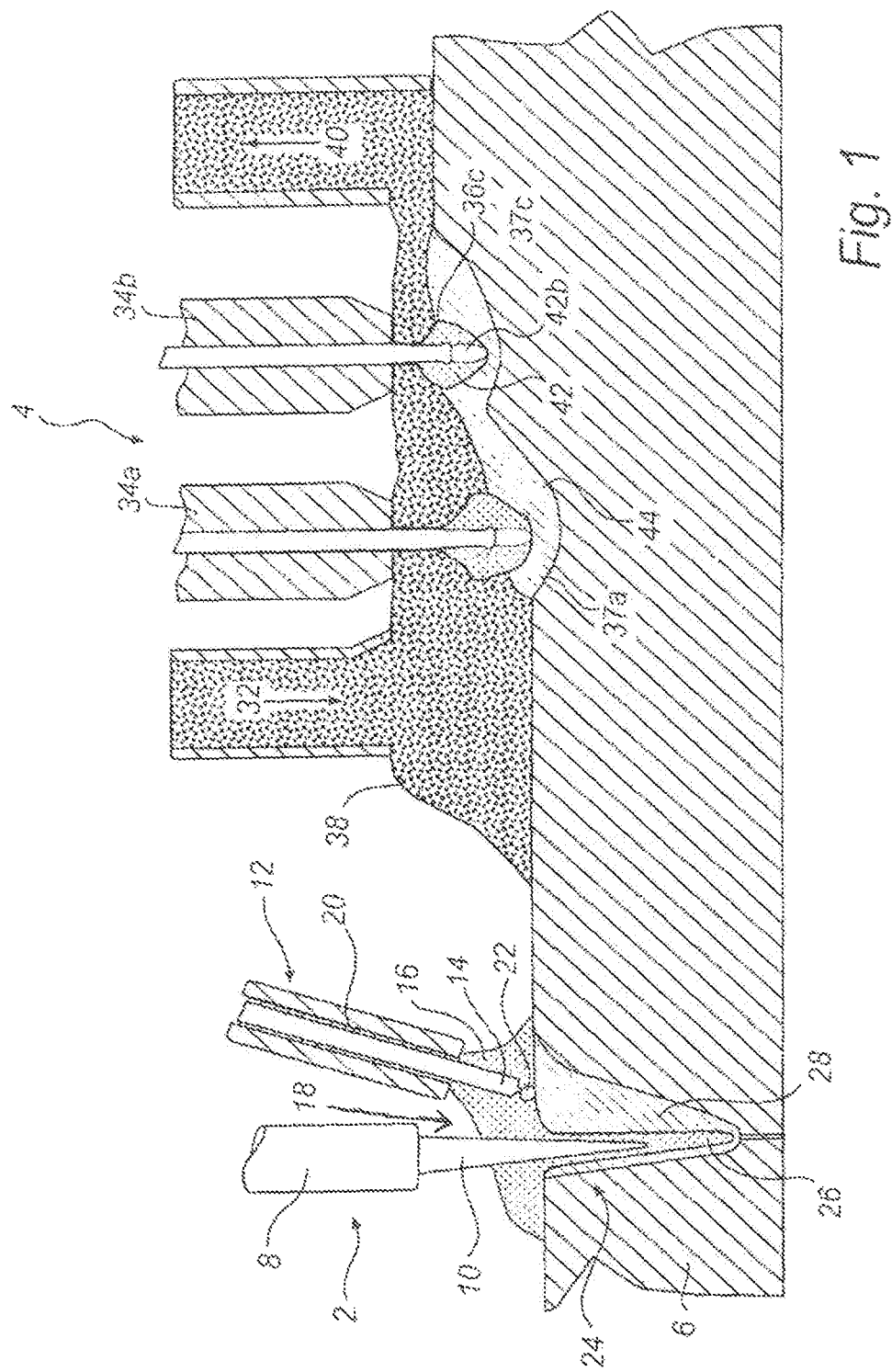
FIG. 1 shows a cross section through a welding arrangement including a hybrid welding head and a submerged arc welding head.

In FIG. 1 a cross section through a welding arrangement 1 including a hybrid welding head 2 and a submerged welding head 4 is shown. The welding arrangement is forming a weld seam between two edge portions of a set of work pieces 6 that are to be joined.

The hybrid welding head includes an optic system 8 generating a laser beam 10 being focused in a root portion of a Y joint. The laser beam may be produced by a YAG laser or a $CO_2$ laser. The hybrid welding head furthermore includes an electric arc welding head 12 including a protruding electrode 14. The electric arc welding head 12 may be a gas metal arc welding head, a tungsten inert gas welding head or a plasma arc welding head. A shielding gas 16 is applied to a welding area 18. In the embodiment shown, the shielding gas 16 is applied via a nozzle 20 present in the electric arc welding head 12. Both the electric arc 22 and the laser beam 10 works in a single interaction zone 24 covered by the shielding gas 16. Various variants of hybrid welding heads are known. These variants may include electric arc welding heads that are positioned to lead and/or lag the laser beam. In the embodiment show a single electric arc welding head is positioned to lag the laser beam. In operation the laser beam generates a deep narrow cavity 26, frequently named a keyhole, at which vaporized metal is present. The keyhole 26 is surrounded by molten metal 28. The hybrid welding head may be of any conventional type known to a person skilled in the art and will therefore not be described in more detail.

The submerged arc welding head 4 is positioned, in relation to a welding direction indicated by the arrow 30, behind the hybrid welding head 2. The submerged welding head 4 includes a flux powder applicator 32, one or more electrode heads 34a, 34b supplying a consumable electrode 36a, 36b penetrating into a layer 38 of flux powder covering the area to be welded. The submerged welding head 4 furthermore includes a flux powder collector 40 which collects flux powder at the end of the process for further use. Various types of submerged welding heads are known, including one or more electrode heads. In the embodiment shown, two electrode heads are used. Each electrode head creates a welding pool 42a, 42b at which molten metal is supplied from the consumable electrode 36a, 36b. The respective electrode 36a, 36b generates arcs 37a, 37b. An area of molten metal 44 builds up a seam during the welding process. The submerged arc head may be of any conventional type known to a person skilled in the art and will therefore not be described in more detail.

Figure 2:
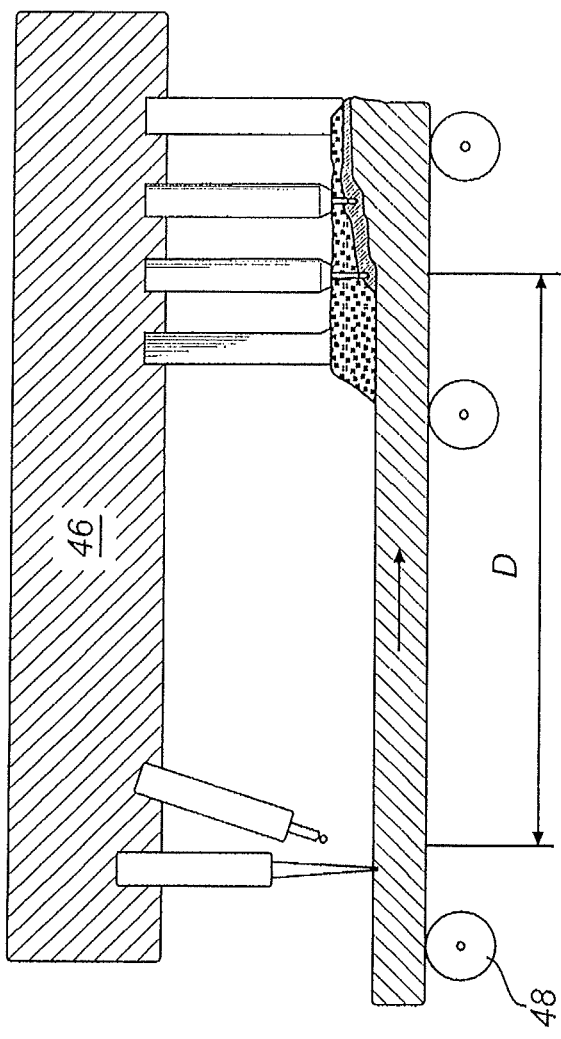
FIG. 2 shows a schematic drawing of a welding arrangement according to the invention mounted on a common stationary carrier structure.
Figure 3:
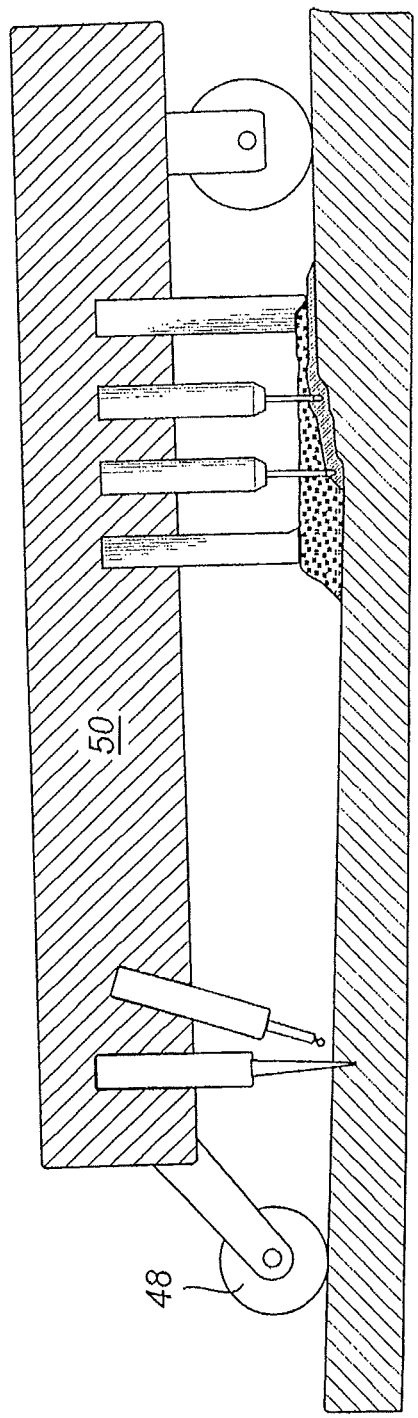
FIG. 3 shows a schematic drawing of a welding arrangement according to the invention mounted on a common movable carrier structure.

In FIG. 2 is shown a schematic drawing of a welding arrangement 1 mounted on a common stationary carrier structure 46. The hybrid welding head 2 and the submerged welding head 4 both acts on the same side of the working piece 6. The common stationary carrier structure 46 carries the hybrid welding head 2 and the submerged arc welding head 4. The hybrid welding head 2 and the submerged arc welding head 4 are mounted at a distance D from each other, where the distance D is measured from the laser beam to the position of the first electrode 36a in the submerged arc welding head. The distance D is preferably selected to be in the range X mm-Y mm in order to allow a seam formed at a root portion of a Y joint to cool sufficiently without allowing an excessive amount of thermal energy to dissipate from the work piece, which may slow down the submerged arc welding process. In the embodiment shown in the figure, an actuator 48 is arranged to enable a relative movement between the common stationary carrier structure 46 and the work pieces or work pieces 6 to be joined by moving the work piece or work pieces 6 past a stationary common carrier structure 46. In the embodiment shown in FIG. 3, the relative movement is accomplished by locating the welding heads 2, 4 on a common moveable carrier structure 50 that is moveable in relation to the work piece or work pieces 6 by an actuator mechanism, suitably including a set of wheels carrying the carrier structure 50 on the work piece or work pieces 6.

Figure 4:
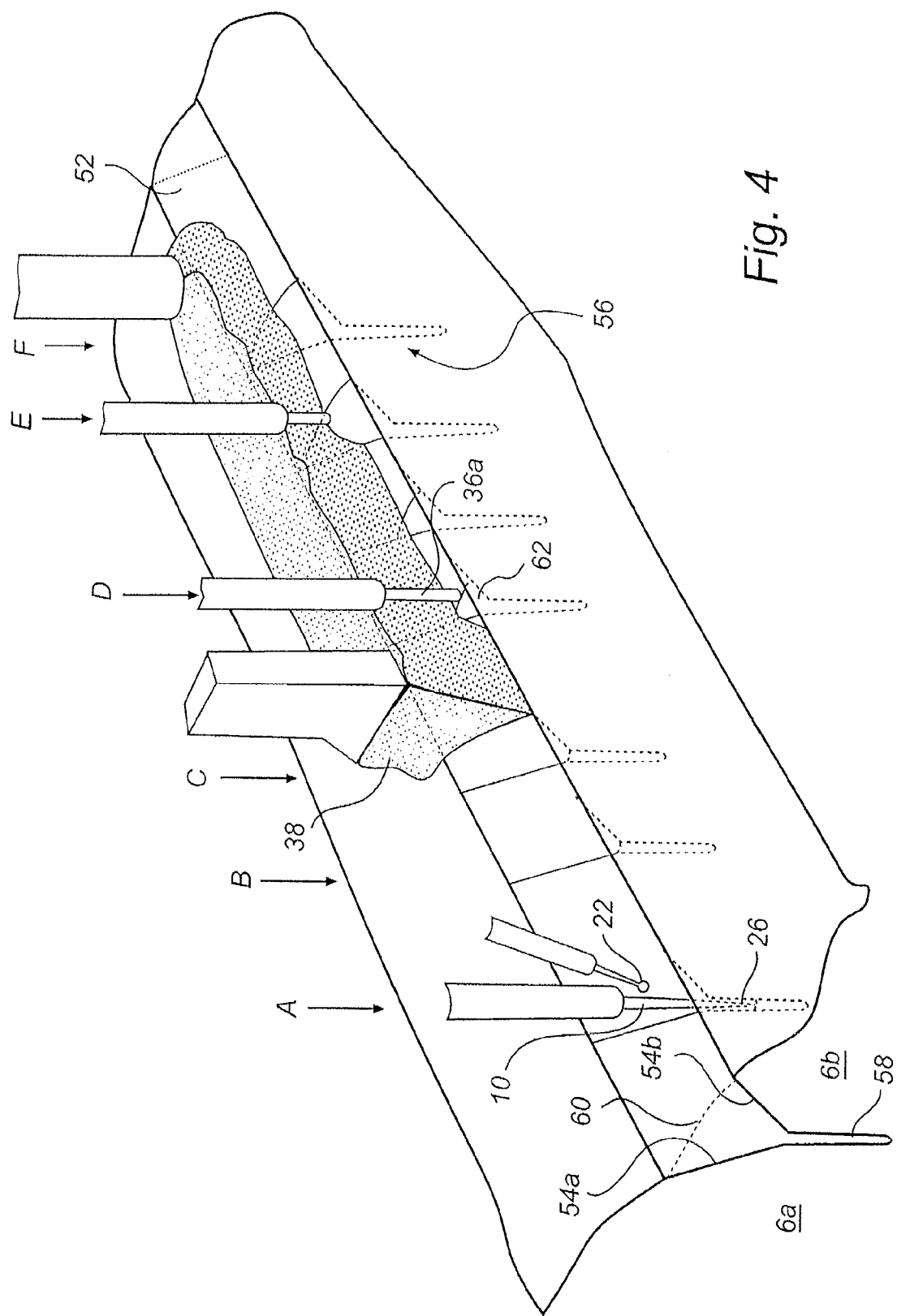
FIG. 4 shows a schematic drawing of a welding process for forming a seam between edge portions of a first and a second work piece.

In FIG. 4 a schematic drawing of a welding process for forming a seam 52 between edge portions 54a, 54b of a first and a second work piece 6a, 6b is shown. The edge portions 54a, 54b form a Y joint 56 having a root portion 58 and a bevel portion 60. The root portion 58 is welded by a hybrid laser electric arc welding process including directing a laser beam 10 and an electric arc 22 in a single interaction zone 24 of plasma and molten metal. At location A in FIG. 4, the root welding is taking place by directing the laser beam 10 into the root portion formed between the work pieces 6a, 6b. A keyhole 26 is developed in the root portion 58. The keyhole 26 should preferably be allowed to penetrate through the root portion. The keyhole is thus created in a full penetration autogenous laser welding process.

An electric arc welding head 12 is positioned to generate an arc in the vicinity of the laser beam. The electric arc welding head may be a gas metal arc welding head, a tungsten inert gas welding head or a plasma arc welding head. The electric arc welding head supplies molten metal that may penetrate into the root portion 58 to form a seam. At position B in FIG. 4, the root portion is filled with molten metal and at position C, the metal at the root portion is solid. In between the positions C and D, the flux powder is applied. The flux powder is thus suitably applied after the root portion 58 has become solid. The flux powder is present as a layer 38 covering the bevel portion 60. At position D a first electric arc is formed in a submerged arc welding process. The electric arc is formed by a first electrode 36a. The first electrode 36a melts an amount of metal forming a puddle 62 in the bevel portion 60. In the embodiment shown a second electrode, located at position E, increases the puddle 56 such that the bevel portion 62 is filled with molten material. As is shown in position E, the bevel portion is filled with molten metal to form a complete joint in a single pass of the welding arrangement. The number of electrodes used in the submerged arc welding process may thus be suitably selected in dependence of the size of the bevel portion.

Figure 5:
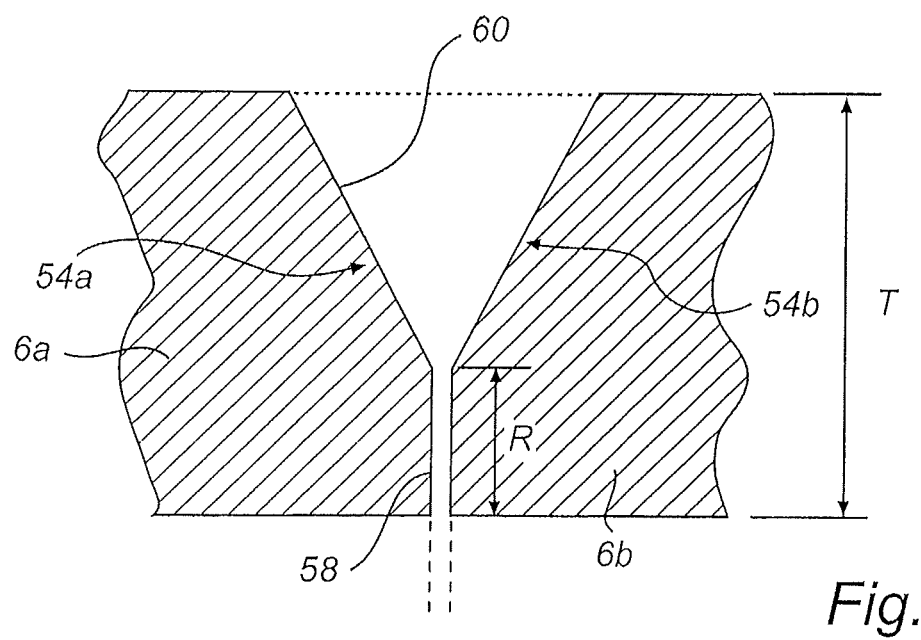
FIG. 5 shows a geometry of edge portions of two work pieces which edges form a Y joint having a root portion and a bevel portion.

In FIG. 5 is shown the geometry of edge portions 54a, 54b of two work pieces 6a, 6b which edges form a Y joint having a root portion 58 and a bevel portion 60. The work pieces 6a, 6b have a thickness T exceeding 15 mm, preferably in between 30-60 mm. The root portion has a thickness R exceeding 8 mm, preferably exceeding 10 mm. The bevel portion 60 has a depth exceeding 15 mm, preferably exceeding 20 mm.

A ratio between the thickness of the root portion and the depth of the bevel portion is suitably selected to be in between 0.4 and 0.6.

The geometry of the Y joint is selected such that the seam may be formed in a single pass while allowing sufficient heat input from the submerged arc welding process to reduce the peaks of hardness generated around the root portion in the hybrid laser electric arc welding process.

Figure 6:
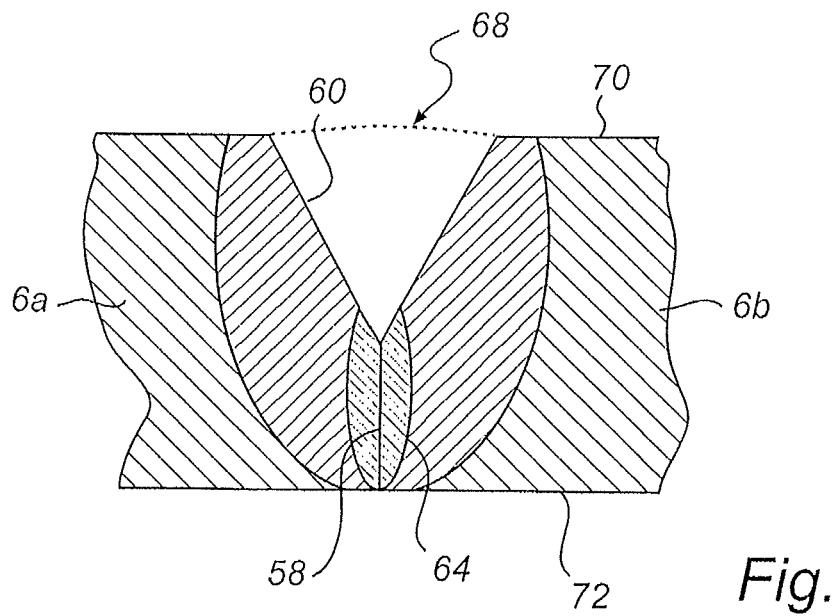
FIG. 6 shows a geometry of the heat affected zones in the weld seam formed by the combined hybrid laser electric arc welding process and the submerged arc welding process.

In the hybrid laser electric arc welding process the laser beam provides an effect exceeding 7 kW and the electric arc provides an effect exceeding 7 kW. The laser beam and electric arc provides substantially equal effects. The individual effects of the laser beam and electric arc are selected in dependence of the thickness of the root portion. Suitably the individual effects of the laser beam and electric arc divided by the thickness of the root portion and the welding speed essentially corresponds to 1 Ws/m$^2$ In FIG. 6 is shown the geometry of the heat affected zones 64, 66 in the weld seam 68 formed by the combined hybrid laser electric arc welding process and the submerged arc welding process. The bevel portion 60 is positioned on a first side 70 of the work pieces 6a, 6b and that the root portion 58 extends to a second opposite side 72 of the work pieces 6a, 6b. The welding parameters for the submerged arc welding process are preferably selected such that a heat affected zone 66 of the submerged arc welding process extend down to second opposite side 72. The heat affected zone 64 from the hybrid laser electric arc welding process extends around the root portion 58 preferably all the way down to the second opposite side 72.

The welding parameters for the submerged arc welding process are selected such that the heat affected zone 66 of the submerged arc welding process encompasses the heat affected zone 64 of the hybrid laser electric arc welding process, as is indicated in the figure.

Figure 7A:
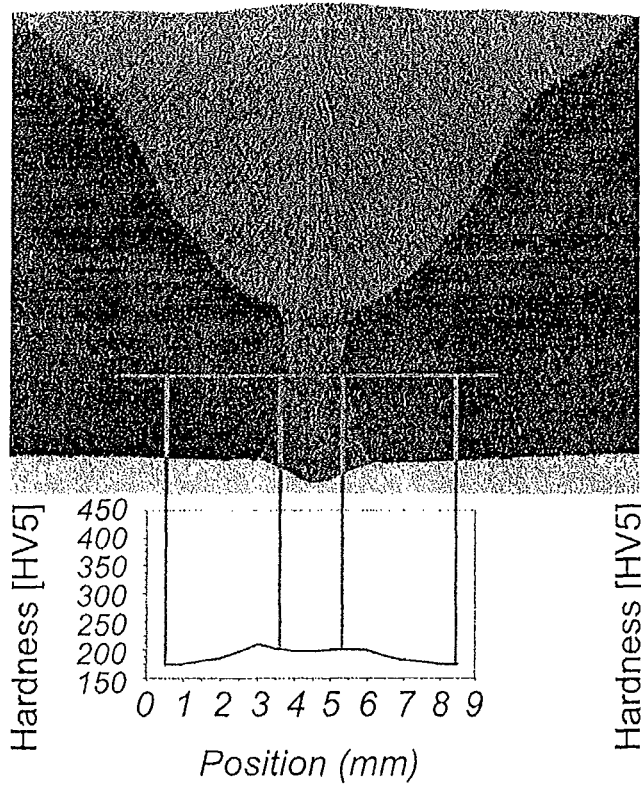
FIG. 7a shows a distribution of material hardness of the joint after both the hybrid laser electric arc welding process and the submerged arc welding processes have been completed.

In FIG. 7a is shown, a distribution of material hardness of the joint after both the hybrid laser electric arc welding process and the submerged arc welding processes have been completed.

Figure 7B:
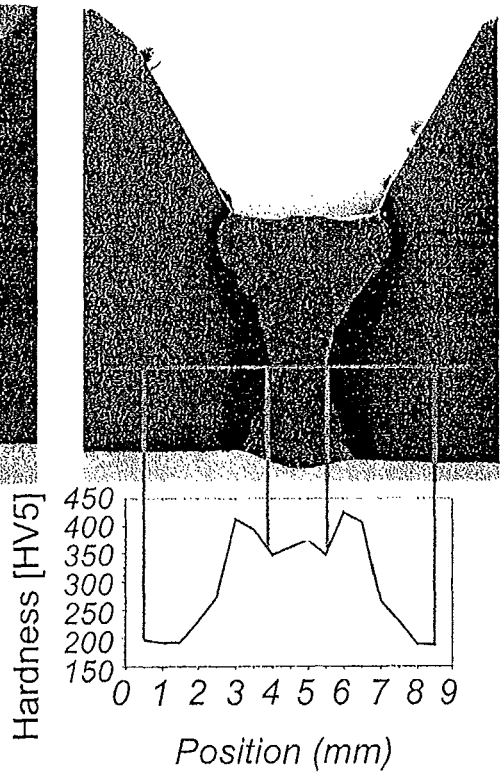
FIG. 7b shows a distribution of material hardness of the joint after the hybrid laser electric arc welding process have been completed and before the submerged arc welding process have been initiated.

In FIG. 7b is shown a distribution of material hardness of the joint after the hybrid laser electric arc welding process have been completed and before the submerged arc welding process have been initiated.

The weld seam in FIGS. 7a and 7b results from an experiment welding process where a complete seam is made in a single pass laser hybrid welding process welding a root portion, combined with a single pass submerged arc welding process welding the bevel portion.

The joint is a Y joint in 12 mm thick CMn steel. A material grade St355 submerged arc method is used in combination with a hybrid laser electric arc process. For the purpose of the example a 4 kW laser was used. The root portion is therefore selected to have a thickness of 4 mm. The bevel portion has an opening angle of 60°. The plate dimensions are 150×400 mm. The pre-angle between the plates are 5°.

In the process used when performing the welding experiment a laser in combination with a gas metal arc welding (GMAW) process are used. The power source for the GMAW process is AristoMIG 500 W. The laser source is a lamp pumped Nd:Yag resonator from Trumpf, HL 4006 D with D70 processing optics.

The SAW process is made by a welding tractor with a SAW twin setup. The power sources are two Scott coupled LAF 635.

The heat input for the hybrid laser electric arc welding process is 0.7 kJ/mm with a contribution from the laser beam of 0.2 kJ/mm. The heat input from the submerged arc welding process is 2.4 kJ/mm.

Measurements of hardness are performed after the hybrid laser electric arc welding process has completed the root, which is shown in FIG. 7a, and after the submerged arc welding process has completed the bevel portion, which is shown in FIG. 7b.

An optimum result would be to reach substantially the same metallurgical properties in the weld zone as in the parent material, that is the unaffected material. The hybrid laser electric arc weld creates hard and brittle joints with a high amount of martensites in black steel and high ferrite contents in duplex stainless steels.

A material hardness diagram in FIG. 7a shows that the weld after the completion of the hybrid laser electric arc welding process reached the hardness over 410 HV in the heat affected zone. The hardness thus varies sharply over the weld seam and has substantially different metallurgical properties in comparison to the unaffected material outside the heat affected zone. A maximum of a derivative of the hardness reach over 200 HV in the zone.

After the submerged arc welding process has completed the weld seam the hardness of the seam in the heat affected zone has been leveled out due to the heat input from the submerged arc welding process. The hardness reaches a maximum of 100 HV in the heat affected zone. A maximum of a derivative of the hardness is in the region of 50 HV in the zone.

The test shows that the proposed method will generate a high quality weld in high strength steel with a low maximum value and low variation of the material hardness over the heat affected zone.

Figure 8:
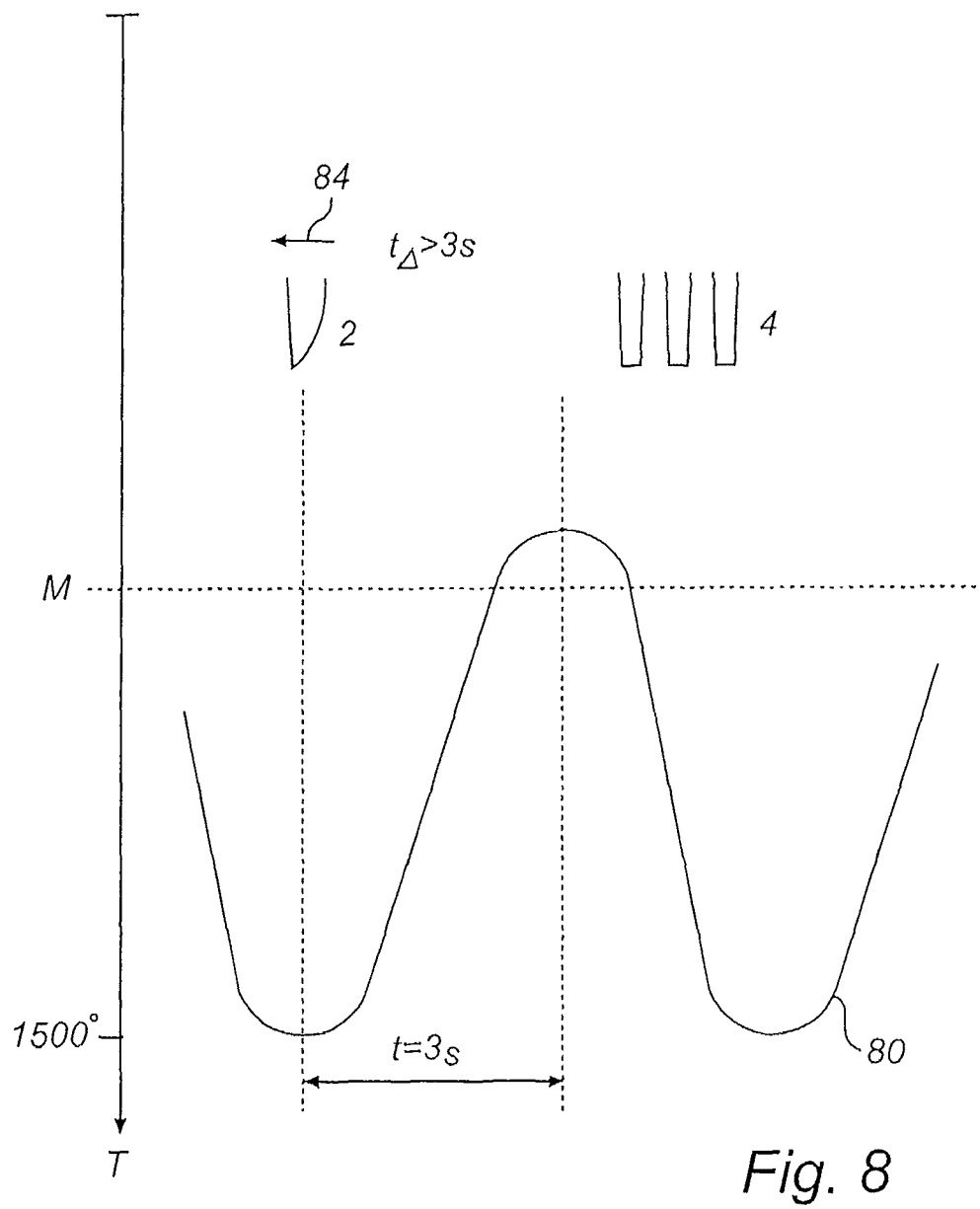
FIG. 8 shows a temperature diagram for a welding process according to the invention.

In FIG. 8 a temperature diagram for a welding process according to the invention is shown. A dotted line 80 indicates the temperature at a centre location of the weld. At the location of hybrid laser electric arc welding head 82, welding takes place. In the welding zone the metal is melt at a temperature of approximately 1500° C. depending on the material used. The welding head 82 is propagating in a direction indicated by arrow 84. When the hybrid laser electric arc welding head has passed, the weld starts to cool and reaches a martensite temperature limit M, where formation of martensite takes place. This occurs approximately 3 seconds after the laser welding head has passed. The martensite temperature limit M is around 300-800° C. depending on the value of the carbon equivalent for the welded material. After the weld has reached the martensite temperature, the submerged arc welding head 86 initiates a welding process to generate a high heat input to the weld seam. The heat input during the submerged arc welding process is preferably at least 3 times as high as the heat input during the hybrid laser electric arc welding process.

Provided a welding speed of around 1 m/s, it would be suitable to mount the hybrid laser electric arc welding head and the submerged arc welding head on a common welding tractor within a distance in between 5-100 cm to each other, preferably around 10-50 cm.

The invention claimed is:

1. A welding process for forming a weld seam between two edge portions, wherein said edge portions form a Y joint having a root portion and a bevel portion, said root portion being welded by a hybrid laser electric arc welding process including directing a laser beam and an electric arc by a hybrid laser electric arc welding head into a single interaction zone of plasma and molten metal,
wherein said single interaction zone being located at said root portion and said bevel portion is welded by a submerged arc welding head in a submerged arc welding process, and
wherein said hybrid welding head is mounted on a common carrier and said submerged arc welding head mounted on said common carrier a distance D away from said hybrid welding head, said common carrier configured to enable a relative movement between the common carrier and said work piece or work pieces such that said root portion and said bevel portion may be welded in a single pass;
wherein the distance D is between 5 to 100 cm.

2. A welding process according to claim 1, wherein the root portion has a thickness exceeding 8 mm.

3. A welding process according to claim 1, wherein the bevel portion has a depth exceeding 15 mm.

4. A welding process according to claim 1, wherein a ratio between a thickness of the root portion and a depth of the bevel portion is in between 0.4 and 0.6.

5. A welding process according to claim 1, wherein the laser beam provides an et exceeding 7 kW and the electric arc provides an effect exceeding 7 kW.

6. A welding process according to claim 5, that wherein beam and electric arc provide substantially equal effects.

7. A welding process according to claim 6, wherein the individual effects of the laser beam and the electric arc divided by the thickness of the root portion and the welding speed essentially corresponds to 1 Ws/m2.

8. A welding process according to claim 1, wherein the root portion and the bevel portion is welded in a single pass.

9. A welding process according to claim 1, wherein at least one of the edges are part of a work piece of a high strength steel having a yield strength exceeding 355 Mpa.

10. A welding process according to claim 1, wherein the welding parameters for the submerged arc welding process are selected such that a heat affected zone of the submerged arc welding process encompasses the heat affected zone of the hybrid laser electric arc welding process.

11. A welding process according to claim 1, wherein the bevel portion is positioned on a first side of a work piece or work pieces to be joined and that the root portion extends to a second opposite side of the work piece or work pieces to be joined, wherein welding parameters for the submerged arc welding process are selected such that a heat affected zone of the submerged arc welding process extend down to said second opposite side.

12. A welding arrangement for welding a Y joint having a root portion and a bevel portion,
  wherein in operation the bevel portion is positioned on a first side of a work piece or work pieces to be joined and that the root portion extends to a second opposite side of the work piece or work pieces to be joined, said welding arrangement including a hybrid welding head arranged to weld said root portion, said hybrid welding head being mounted for operation facing said first side,
  wherein the welding arrangement further includes a submerged arc welding head being mounted for in operation facing said first side, and
  wherein said hybrid welding head is mounted on a common carrier and said submerged arc welding head is mounted on said common carrier a distance D away from said hybrid welding head, said common carrier configured to enable a relative movement between the common carrier and said work piece or work pieces such that said root portion and said bevel portion may be welded in a single pass;
  wherein the distance D is between 5 to 100 cm.

13. A welding arrangement according to claim 12, wherein the welding arrangement further includes an actuator which is arranged to enable the relative movement between the common carrier and the work piece or work pieces to be joined.

14. A welding arrangement according to claim 12, wherein the common carrier is configured to be propelled on or over the work piece or work pieces to be joined.

15. A system for welding a Y joint in a work piece, the Y joint having a root portion and a bevel portion, the system comprising:
  a common carrier;
  a hybrid electric arc welding head arranged to weld said root portion, said hybrid electric arc welding head including an optic system configured to generate a laser beam and an electric arc welding head; and
  a submerged arc welding head arranged to weld said bevel portion, said submerged arc welding head including one or more electrode heads;
  wherein said hybrid welding head is mounted on said common carrier and said submerged arc welding head is mounted on said common carrier a distance D away from said hybrid welding head, said common carrier configured to enable a relative movement between the common carrier and said work piece or work pieces such that said root portion and said bevel portion may be welded in a single pass; wherein the distance D is between 5 to 100 cm.

16. The system of claim 15, wherein the common carrier is configured to enable the relative movement between said common carrier and said work piece or work pieces at approximately 1 m/s.

17. The system of claim 15, wherein the common carrier is configured to enable the relative movement between said common carrier and said work piece or work pieces such that the submerged arc welding head is positioned over said root portion when said root portion reaches a desired temperature.

18. The system of claim 15, wherein the submerged arc welding head is configured to provide a heat input during a submerged arc welding process of at least three times the heat input with which the hybrid welding head is configured to provide during a hybrid electric arc welding process.

19. A system for welding a Y joint in a work piece, the Y joint having a root portion and a bevel portion the system comprising:
  a common carrier;
  a hybrid electric arc welding head arranged to weld said root portion said hybrid electric arc welding head including an optic system configured to generate a laser beam and an electric arc welding head; and
  a submerged arc welding head arranged to weld said bevel portion, said submerged arc welding head including one or more electrode heads;
  wherein said hybrid welding head mounted on said common carrier and said submerged arc welding head mounted on said common carrier a distance D away from said hybrid welding head, said common carrier configured to enable a relative movement between the common carrier and said work piece or work pieces such that said root portion and said bevel portion ma be welded in a single pass;
  wherein the submerged arc welding head is configured to provide a heat input during a submerged arc welding process of approximately 2.4 kJ/mm and the hybrid welding head is configured to provide a heat input during a hybrid electric arc welding process of 0.7 kJ/mm.

* * * * *